US009451607B2

(12) United States Patent
Lee et al.

(10) Patent No.: US 9,451,607 B2
(45) Date of Patent: Sep. 20, 2016

(54) METHOD FOR TRANSMITTING AND RECEIVING DOWNLINK CONTROL INFORMATION

(71) Applicant: LG Electronics Inc., Seoul (KR)

(72) Inventors: Moon IL Lee, Anyang-si (KR); Hyun Soo Ko, Anyang-si (KR); Bin Chul Ihm, Anyang-si (KR); Wook Bong Lee, Anyang-si (KR); Jae Hoon Chung, Anyang-si (KR); Jin Young Chun, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 133 days.

(21) Appl. No.: 14/535,935

(22) Filed: Nov. 7, 2014

(65) Prior Publication Data

US 2015/0098426 A1  Apr. 9, 2015

Related U.S. Application Data

(63) Continuation of application No. 13/646,460, filed on Oct. 5, 2012, now Pat. No. 8,917,791, which is a continuation of application No. 12/382,999, filed on Mar. 27, 2009, now Pat. No. 8,315,324.

(Continued)

(30) Foreign Application Priority Data

Oct. 13, 2008 (KR) .................. 10-2008-0100020

(51) Int. Cl.
*H04B 7/02* (2006.01)
*H04L 1/02* (2006.01)

(Continued)

(52) U.S. Cl.
CPC ......... *H04W 72/042* (2013.01); *H04B 7/0417* (2013.01); *H04B 7/0665* (2013.01);
(Continued)

(58) Field of Classification Search
CPC .......... H04W 72/042; H04W 72/0413; H04B 7/0417; H04B 7/0665; H04B 7/0634; H04B 7/0639; H04L 1/0028; H04L 1/0618; H04L 5/0007; H04L 5/0053; H04L 25/06; H04L 1/0026; H04L 1/0072; H04L 1/1664
USPC ................................ 375/267, 316, 219, 295
See application file for complete search history.

(56) References Cited

U.S. PATENT DOCUMENTS

2009/0316626 A1  12/2009 Lee et al.
2012/0008580 A1  1/2012 Lee et al.

FOREIGN PATENT DOCUMENTS

JP  2011-523263 A  8/2011
KR  10-2004-0089748  10/2004
(Continued)

OTHER PUBLICATIONS

"3GPP TS 36.211: Physical Channels and Modulation", Technical Specification Group Radio Access Network; 3rd Generation Partnership Project (Release 8), V2.2.0 (Mar. 2008).*
(Continued)

*Primary Examiner* — Nader Bolourchi
(74) *Attorney, Agent, or Firm* — Dentons US LLP

(57) ABSTRACT

A method for efficiently transmitting and receiving downlink control information is disclosed. The method includes, at a base station, receiving feedback information including a precoding matrix index (PMI) from a user equipment (UE) and transmitting precoding information having a predetermined bit number according to the number of antenna ports and a transmission mode of the base station. The precoding information of a predetermined transmission mode in the precoding information includes confirmation information indicating that the base station uses a PMI which is recently received from the UE.

12 Claims, 4 Drawing Sheets

Related U.S. Application Data

(60) Provisional application No. 61/045,971, filed on Apr. 18, 2008, provisional application No. 61/075,303, filed on Jun. 24, 2008, provisional application No. 61/077,860, filed on Jul. 2, 2008.

(51) Int. Cl.

| | | |
|---|---|---|
| *H04W 72/04* | (2009.01) | |
| *H04B 7/04* | (2006.01) | |
| *H04L 1/06* | (2006.01) | |
| *H04L 5/00* | (2006.01) | |
| *H04L 25/06* | (2006.01) | |
| *H04B 7/06* | (2006.01) | |
| *H04L 1/00* | (2006.01) | |
| *H04L 1/16* | (2006.01) | |

(52) U.S. Cl.
CPC ............ *H04L1/0028* (2013.01); *H04L 1/0618* (2013.01); *H04L 5/0007* (2013.01); *H04L 5/0053* (2013.01); *H04L 25/06* (2013.01); *H04W 72/0413* (2013.01); *H04B 7/0634* (2013.01); *H04B 7/0639* (2013.01); *H04L 1/0026* (2013.01); *H04L 1/0072* (2013.01); *H04L 1/1664* (2013.01)

(56) References Cited

FOREIGN PATENT DOCUMENTS

| KR | 10-2005-0020576 | 3/2005 |
|---|---|---|
| KR | 10-2006-0096360 | 9/2006 |
| KR | 10-2007-0042099 | 4/2007 |

OTHER PUBLICATIONS

Sharp, PMI Synchronization issues[online], 3GPP TSG-RAN WG1#52b R1-081244, Mar. 31, 2008.

NEC Group, Further clarification on precoding confirmation[online], 3GPP TSG-RAN WG1#53 R1-081758, May 5, 2008.

LG Electronics, Downlink Control Signaling for SU-MIMO[online], 3GPP TSG-RAN WG1#52b R1-081254, Mar. 31, 2008.

Texas Instruments, Coding of Control Information on Pusch[online], 3GPP TSG-RAN WG1#52b R1-081370, Mar. 31, 2008.

LG Electronics, Remaining Control Signaling Issues for Downlink MIMO[online], 3GPP TSG-RAN WG1#53 R1-081811, May 5, 2008.

R1-081616, "Multiplexing of Rank and CQI/PMI in PUSCH Channel," Mar. 31-Apr. 4, 2008, Shenzhen, China.

R1-081237, "Relationship of Rank Report and PUCCH CQI/PMI Reports," Mar. 31-Apr. 4, 2008, Shenzhen, China.

Index of Contributions to 3GPP TSG-RAN Working Group 1, 2007.
Index of Contributions to 3GPP TSG-RAN Working Group 1, 2008.
NTT Docomo et al: "Investigation on PMI Indication Schemes for Single-User MIMO Precoding in E-UTRA Downlink", 3GPP DRAF; R1-081037, Feb. 5, 2008.

Ericsson et al: "Refinements on Signalling of CQI/Precoding Information on PDCCH", 3GPP Draft; R1-081682, Apr. 9, 2008.

* cited by examiner

METHOD FOR TRANSMITTING AND RECEIVING DOWNLINK CONTROL INFORMATION

CROSS-REFERENCE TO RELATED APPLICATIONS

This application is a continuation of U.S. application Ser. No. 13/646,460, filed Oct. 5, 2012, which is a Continuation of application Ser. No. 12/382,999, filed Mar. 27, 2009 (now U.S. Pat. No. 8,315,324), and claims priority to U.S. Provisional Application Nos. 61/045,971, filed Apr. 18, 2008; 61/075,303, filed Jun. 24, 2008; 61/077,860, filed Jul. 2, 2008; and Korean Patent Application No. 10-2008-0100020, filed Oct. 13, 2008, the contents of each of the above-identified applications is incorporated by reference herein in their entireties.

BACKGROUND OF THE INVENTION

1. Field of the Invention

The present invention relates to a mobile communication technology, and more particularly, to a method of efficiently transmitting and receiving downlink control information (DCI).

2. Discussion of the Related Art

In a next-generation mobile communication system, a high data transmission rate is required. Thus, various researches into a multi-input multi-output (MIMO) antenna technology are ongoing. First, a general MIMO technology will be briefly described.

The MIMO is abbreviated from the term "multi-input multi-output" and indicates a method of employing multiple transmission antennas and multiple reception antennas so as to improve transmission/reception data efficiency, instead of a conventional method using one transmission antenna and one reception antenna. That is, a transmitter or a receiver of a radio communication system uses multiple antennas so as to increase communication capacity or improve transmission/reception performance. Hereinafter, the "MIMO" is also referred to as "multi-input multi-output antenna".

The multi-input multi-output antenna technology indicates a technology of collecting data pieces received via several antennas without depending on a single antenna path in order to receive one message. According to the MIMO technology, a data transmission rate is improved in a specific range or a system range can be increased with respect to a specific data transmission rate.

Since next-generation mobile communication requires a data transmission rate which is significantly higher than that of the existing mobile communication, an efficient multi-input multi-output antenna technology is expected to be necessarily required. Under these circumferences, the MIMO communication technology is the next-generation mobile communication technology which is widely applicable to mobile communication terminals and repeaters. The MIMO technology is attracting attention as the next-generation technology to overcome the restricted transmission amount of the mobile communication that has reached the limit due to the data communication extension.

Among various technologies of improving transmission efficiency which are currently being researched, the MIMO technology of using multiple antennas in both a transmitter and a receiver is attracting most attention as a method of remarkably improving communication capacity and transmission/reception performance with increasing additional frequency allocation or power consumption.

FIG. 1 is a view showing the configuration of a general MIMO antenna communication system.

As shown in FIG. 1, if the number of transmission antennas is increased to $N_T$ and, at the same time, the number of reception antennas is increased to $N_R$, a theoretical channel transmission capacity is increased in proportion to the number of antenna ports, unlike the case where multiple antennas are used in only any one of the transmitter and the receiver. Thus, frequency efficiency can be remarkably improved. The transmission rate due to the increase in channel transmission capacity can be theoretically increased by a value obtained by multiplying a maximum transmission rate $R_o$ at the time of using one antenna by a rate increasing ratio ($R_i$).

$$R_i = \min(N_T, N_R) \qquad \text{Equation 1}$$

That is, for example, in an MIMO communication technology using four transmission antennas and four reception antennas, the transmission rate is theoretically four times that of a single-input single-output antenna system.

After the theoretical increase in the capacity of the MIMO antenna system was proved in the mid-1990s, various technologies of substantially improving a data transmission rate have been actively developed up to now. Among them, several technologies have been already applied to the various radio communication standards such as the third-generation mobile communication and the next-generation wireless local area network (LAN).

According to the trend of the research into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The MIMO technology includes a spatial diversity method for increasing transmission reliability using symbols passing through various channel paths and a spatial multiplexing method for improving a transmission rate by simultaneously transmitting a plurality of data symbols using a plurality of transmission antennas. Recently, researches into a method of obtaining the respective advantages of the two methods by combining the two above-described methods are ongoing.

Hereinafter, the methods will be described in detail.

First, the spatial diversity method includes a space-time block coding method and a space-time trellis coding method using both a diversity gain and a coding gain. Generally, the trellis coding method is excellent in view of the improvement of a bit error rate and the degree of freedom for code generation, but the space-time block coding method is advantageous in that computation complexity is simple. A spatial diversity gain can be obtained from a product $N_T \times N_R$ of the number $N_T$ of transmission antennas and the number $N_R$ of reception antennas.

Second, the spatial multiplexing method indicates a method of transmitting different data streams via transmission antennas. At this time, in a receiver, mutual interference is generated between data which are transmitted from a transmitter. The receiver eliminates the interference using an adequate signal processing method and receives the data. The receiver for eliminating noise, which is used herein, includes a maximum likelihood receiver, a zero forcing (ZF) receiver, a minimum mean-squared errors (MMSE) receiver, a Diagonal Bell Laboratories Layered Space-Time (D-BLAST) receiver and a Vertical Bell Laboratory Layered Space-Time (V-BLAST) receiver. In particular, if the transmitter can know channel information, a singular value decomposition (SVD) method may be used.

Third, a combination of the spatial diversity method and the spatial multiplexing method may be used. If only the spatial diversity gain is obtained, a performance improvement gain according to the increase in diversity order is gradually saturated. If only the spatial multiplexing gain is obtained, the transmission reliability of the radio channel deteriorates. Accordingly, researches into the methods of obtaining both the two gains while solving the above-described problems have been conducted. Among them, a Double Space-Time Transmit Diversity (Double-STTD) or Space-Time Bit Interleaved Coded Modulation (STBICM) may be used.

In the MIMO antenna system, the transmitter performs precoding with respect to transmission data and transmits the pre-coded data, and the receiver receives the signal using a precoding vector or a precoding matrix used in the transmitter.

The precoding matrix for performing the precoding uses a specific precoding matrix among precoding matrixes which are predefined in the form of a codebook in both the transmitter and the receiver. That is, the receiver feeds back channel information according to the specific precoding matrix in the predefined codebook to the transmitter, and the transmitter transmits the signal using the feedback signal.

In downlink transmission, the receiver may be a user equipment (UE) or a terminal and the transmitter may be a base station, a node-B or an eNode-B (hereinafter collectively called as "base station"). For example, the UE may report a specific precoding matrix index (hereinafter, referred to as a "PMI") in the predefined codebook via an uplink channel, and the base station may transmit a downlink signal using a precoding matrix corresponding to the reported PMI.

There may be a plurality of PMIs which are temporally reported by the UE. Accordingly, confusion about which of the PMIs is used by the base station may occur. In order to solve this problem, the base station preferably transmits control information indicating which of the PMIs reported by the UE is used. If the control information explicitly indicating which of the PMIs reported by the UE is used by the base station is transmitted via a downlink channel, the overhead of the downlink control information may be increased.

Accordingly, there is a need for a technology of efficiently preventing confusion about a PMI used between the base station and the UE from occurring using a small amount of control information.

SUMMARY OF THE INVENTION

Technical Problem

An object of the present invention devised to solve the problem lies on a method of efficiently informing a user equipment (UE) of information about a precoding matrix index (PMI) used by an base station using a small amount of control information for precoding, that is, precoding information.

In the embodiment, a confirmation information is explicitly defined in precoding information having a small bit number according to a temporal relationship between the transmission of the feedback information by the UE and the transmission of the control information by the base station. Another object of the present invention devised to solve the problem lies on a CRC attaching method capable of minimizing the overhead while system performance is maintained, when the above-described method is performed.

Technical Solution

The object of the present invention can be achieved by providing a method for transmitting downlink control information by an base station, the method including: receiving feedback information including a precoding matrix index (PMI) from an user equipment (UE); applying a precoding to a downlink signal and transmitting the downlink signal; and transmitting precoding information having a predetermined number of bits according to the number of antenna ports and a transmission mode of the base station, wherein the precoding information of a specific transmission mode in the precoding information includes confirmation information indicating that the base station applied a precoding according to a PMI received from the UE, wherein the precoding to the downlink signal for a specific resource block (RB) in $n^{th}$ subframe is according to a latest PMI received from the UE on or before n-$x^{th}$ subframe, and wherein "x" is a predetermined integer or an integer determined by upper layer signaling higher than a physical layer.

In another aspect of the present invention, provided herein is a method for receiving downlink control information from an base station by a user equipment (UE), the method including: transmitting feedback information including a precoding matrix index (PMI) to the base station; receiving a downlink signal from the base station, wherein the base station has applied a precoding to the downlink signal; and receiving precoding information having a predetermined number of bits according to the number of antenna ports and a transmission mode of the base station, wherein the precoding information of a specific transmission mode includes confirmation information indicating that the base station applied a precoding according to a PMI transmitted from the UE, wherein the precoding applied by the base station to the downlink signal for a specific resource block (RB) in $n^{th}$ subframe is according to a latest PMI transmitted from the UE on or before n-$x^{th}$ subframe, and wherein "x" is a predetermined integer or an integer determined by upper layer signaling higher than a physical layer.

In on embodiment, "x" may be predetermined as 4.

The transmitting/receiving of the feedback information may include transmitting/receiving the PMI via at least one of a physical uplink control channel (PUCCH) and a physical uplink shared channel (PUSCH) from the UE, and the confirmation information considers only the PMI transmitted/received via the PUSCH. In addition, a cyclic redundancy check (CRC) may be attached to the PMI transmitted/received via the PUSCH, and the CRC may not be attached to the PMI transmitted/received via the PUSCH.

The transmitting/receiving of the feedback information may include transmitting/receiving the PUCCH including the PMI which is piggy-backed to the PUSCH, and the CRC may not be attached to the PMI in the PUCCH which is piggy-backed to the PUSCH.

When the feedback information is transmitted/received via the PUSCH, the feedback information may be transmitted in any one of a single PMI transmission mode or a multi PMI transmission mode, and, only when the feedback information is transmitted in the multi PMI transmission mode, the CRC may be attached to the PMI.

The precoding information of the specific transmission mode may be precoding information of a closed-loop spatial multiplexing transmission mode.

Advantageous Effects

As described above, according to the embodiments of the present invention, it is possible to efficiently inform a user equipment (UE) of information about PMI used by an base station using a small amount of precoding information. In particular, it is possible to prevent confusion between the base station and the UE from occurring using a small amount of control information by explicitly defining the confirmation information in the precoding information having a small bit number according to a temporal relationship between the transmission of the feedback information of the UE and the transmission of the control information of the base station.

In addition, it is possible to minimize the overhead while maintaining system performance by efficiently setting the CRC attachment.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced.

The detailed description includes details for the purpose of providing an understanding of the present invention. However, it will be apparent to those skilled in the art that these teachings may be implemented and practiced without these specific details. In some instances, well-known structures and devices are omitted in order to avoid obscuring the concepts of the present invention and the important functions of the structures and devices are shown in block diagram form. The same reference numbers will be used throughout the drawings to refer to the same or like parts.

As described above, if information indicating which of precoding matrix indexes (PMIs) reported by a user equipment (UE) is used by an base station is not informed, confusion about the used PMI between the base station and the UE occurs and thus system performance may deteriorate. If information about the PMI used by the base station is explicitly described in downlink control information (DCI), the above confusion about the used PMI does not occur. But serious overhead may occur in a restricted downlink control channel as described above. Accordingly, the present invention provides a method of efficiently informing the UE of the information about the PMI used by the base station using a small amount of control information for precoding. Hereinafter, a method of transmitting DCI in a $3^{rd}$ Generation Partnership Project Long Term Evolution (3GPP LTE) system will be described. The 3GPP LTE system is only exemplary and the present invention is applicable to any mobile communication system by the same method.

In 3GPP TS 36.212: "Multiplexing and Channel Coding" (release 8), v8.2.0 (2008-3), the DCI includes downlink or uplink scheduling information or uplink power control information of one media access control (MAC) ID. The MAC ID may be implicitly encoded by a cyclic redundancy check (CRC). The DCI may be transmitted as follows.

Figure 1:
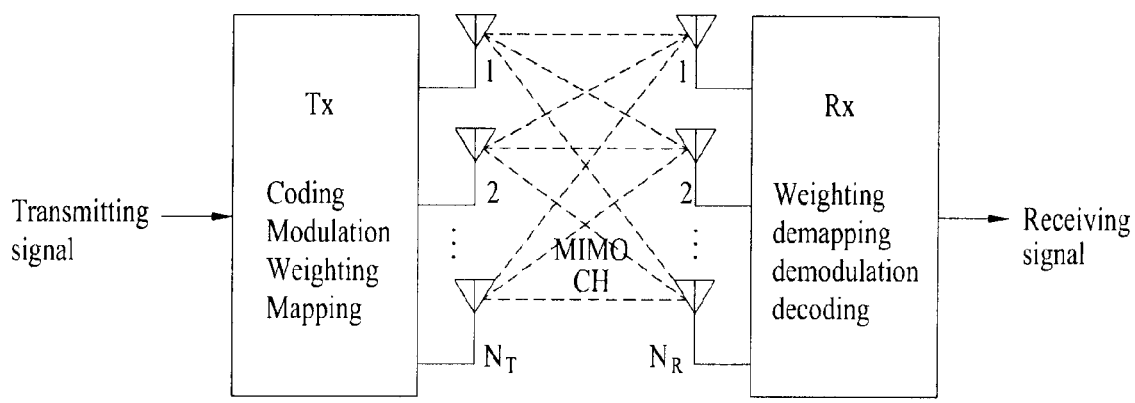
FIG. 1 is a view showing the configuration of a general multi-input multi-output (MIMO) communication system.
Figure 2:
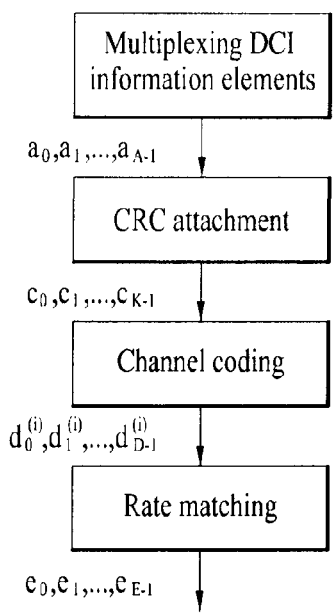
FIG. 2 is a flowchart illustrating a processing structure of downlink control information (DCI).

FIG. 2 is a flowchart illustrating a processing structure of DCI.

First, DCI information elements are multiplexed. At this time, multiplexing may be performed according to a method defined in the following DCI format. In 3GPP TS 36.212: "Multiplexing and Channel Coding" (Release 8), v8.2.0 (2008-3), formats 0, 1, 1A, 1C and 2 are defined as the DCI format. In more detail, the format 0 may be used for scheduling of physical uplink shared channel (PUSCH), the format 1 may be used for scheduling of a physical downlink shared channel (PDSCH) codeword, the format 1A may be used for dense scheduling of one PDSCH codeword, the format 1C may be used for dense allocation of Downlink-Shared Channel (DL-SCH) allocation, and the format 2 may be used for scheduling of the PDSCH to a UE in a spatial multiplexing mode.

The multiplexed information elements are attached with a CRC for checking the reception error. The CRC may be attached to only a specific information element according to the transmitted information or may be attached by different methods according to the DCI formats. The CRC attached DCI is channel-coded. Thereafter, rate matching is performed with respect to the channel-coded DCI according to transmission rates.

Among the above-described DCT formats, the format 2 used for scheduling of the PDSCH to the UE in the spatial multiplexing mode will be described in detail.

The DCI format 2 may include a resource allocation header, a resource block assignment, a TPC command for PUCCH, a downlink assignment index (applied to only a TDD operation), a HARQ process number and a HARQ swapping flag. A modulation and coding scheme, a new data indicator and redundancy version information may be included with respect to codewords 1 and 2. In addition, precoding information having a predetermined number of bits according to the number of antenna ports and a transmission mode of the base station may be included.

The number of bits of the precoding information in the 3GPP LTE system is defined as follows.

TABLE 1

| Number of antenna ports at base station | Transmission mode | |
|---|---|---|
| | Closed-loop spatial multiplexing | Open-loop spatial multiplexing |
| 2 | 3 | 0 |
| 4 | 6 | 3 |

In the 3GPP LTE system, a maximum of two codewords can be simultaneously transmitted. A codeword field indicating whether a corresponding codeword is activated or inactivated may be included in the DCI format 2. However, the information indicating whether any codeword is activated or not may be transferred implicitly. That is, the information indicating whether any codeword is activated or not may be transferred by other control information. The analysis of the precoding information having the number of bits of Table 1 may be changed according to the codeword field indicating whether the codeword is activated or inactivated.

In the embodiment of the present invention, a method of efficiently informing the UE of the information about the PMI used by the base station while the amount of additional control information is minimized, by adding a confirmation information to a portion of a combination represented by the precoding information having a predetermined number of bits which is differently analyzed depending on whether the codeword is activated or inactivated, is suggested. Since the confirmation information indicates that a PMI which is recently received from the UE is used by the base station, a temporal relationship between the PMI reported by the UE and the PMI used by the base station needs to be clearly defined, in order to prevent confusion between the base station and the UE from occurring.

Figure 3:
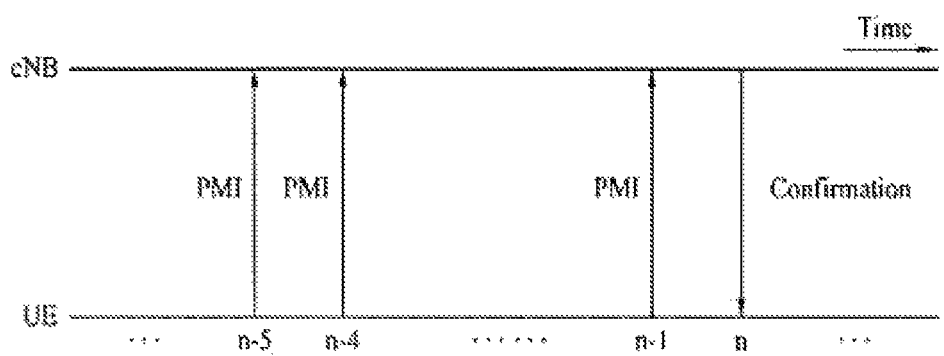
FIG. 3 is a view showing a temporal relationship between a precoding matrix index (PMI) reported by a user equipment (UE) and confirmation information according to an embodiment of the present invention.

FIG. 3 is a view showing a temporal relationship between the PMI reported by a UE and confirmation information according to an embodiment of the present invention.

In FIG. 3, a horizontal axis denotes a time and ... n-5, n-4, ..., n-1, n, ... denote subframe indexes. As shown in FIG. 3, the UE may feed back the PMI to the base station for each subframe. If the base station transmits the confirmation information to the UE on the basis of an $n^{th}$ subframe, the confirmation information indicates that the PMI received from UE is used by the base station. A predetermined processing time may be consumed for enabling the base station to use the PMI received from the UE, as shown in FIG. 3. Thus, the PMI corresponding to the confirmation information may be a PMI reported by the UE before a predetermined frame, for example, a PMI reported from the UE at an n-$x^{th}$ subframe. At this time, "x" may be a predetermined integer or an integer determined according to upper layer signaling information.

Accordingly, in a preferred embodiment of the present invention, the confirmation information indicates that the latest PMI received is used by the base station. If a time point when the confirmation information is transmitted is the $n^{th}$ subframe, the confirmation information indicates that the latest PMI reported via the n-$x^{th}$ subframe is used. In more detail, in order to process the PMI received from the UE, a time of about 3 ms may be consumed. In this case, it is preferable that x is predetermined as 4.

Here, "the confirmation information" may be referred differently, such as "confirmation field" or just downlink control information entry information that the base station applied PMI received from UE to corresponding precoding.

Meanwhile, the precoding information may have bit numbers which are changed according to the number of antenna ports and transmission mode of the base station as shown in Table 1. At this time, the transmission mode may include an open-loop spatial multiplexing mode and a closed-loop spatial multiplexing mode as shown in Table 1.

In the open-loop spatial multiplexing mode, since a rank and a PMI are selectively transmitted without receiving feedback information from the UE, the advantage due to the addition of the confirmation information cannot be obtained. Accordingly, in the present embodiment, the confirmation information may be added only to the precoding information of the closed-loop spatial multiplexing transmission mode. Accordingly, the detailed contents of the precoding information having the bit numbers shown in Table 1 may be set as follows.

TABLE 2

| One codeword: Codeword 1 enabled, Codeword 2 disabled | | Two codewords: Codeword 1 enabled, Codeword 2 enabled | |
|---|---|---|---|
| Bit field mapped to index | message | Bit field mapped to index | message |
| 0 | RI = 1: transmission diversity | 0 | RI = 2: PMI corresponding to precoding matrix $\frac{1}{2}\begin{bmatrix}1 & 1\\1 & -1\end{bmatrix}$ |
| 1 | RI = 1: PMI corresponding to precoding vector $[1\ 1]^T/\sqrt{2}$ | 1 | RI = 2: PMI corresponding to precoding matrix $\frac{1}{2}\begin{bmatrix}1 & 1\\j & -j\end{bmatrix}$ |
| 2 | RI = 1: PMI corresponding to precoding vector $[1\ -1]^T/\sqrt{2}$ | 2 | RI = 2: confirm the latest PMI reported via PUSCH |
| 3 | RI = 1: PMI corresponding to precoding vector $[1\ j]^T/\sqrt{2}$ | 3 | Reserved |
| 4 | RI = 1: PMI corresponding to precoding vector $[1\ -j]^T/\sqrt{2}$ | 4 | Reserved |
| 5 | RI = 1: confirm the latest PMI reported via PUSCH, If RI = 2 is reported, first column of all precoder represented by reported PMI and reported RI is used | 5 | Reserved |
| 6 | RI = 1: confirm the latest PMI reported via PUSCH, If RI = 2 is reported, second column of all precoder represented by reported PMI and reported RI is used | 6 | Reserved |
| 7 | Reserved | 7 | reserved |

TABLE 3

| One codeword: Codeword 1 enabled, Codeword 2 disabled | | Two codewords: Codeword 1 enabled, Codeword 2 enabled | |
|---|---|---|---|
| Bit field mapped to index | Message | Bit field mapped to index | message |
| 0 | RI = 1: transmission diversity | 0 | R = 2: PMI = 0 |
| 1 | RI = 2: PMI = 0 | 1 | RI = 2: PMI = 1 |
| 2 | RI = 1: PMI = 1 | . | . |
| . | . | . | . |
| . | . | 15 | RI = 2: PMI = 15 |
| . | . | | |
| 16 | RI = 1: PMI = 15 | 16 | RI = 2: confirm the latest PMI reported via PUSCH |
| 17 | RI = 1: confirm the latest PMI reported via PUSCH | 17 | RI = 3: PMI = 0 |
| 18 | RI = 2: PMI = 0 | 18 | RI = 3: PMI = 0 |
| 19 | RI = 2: PMI = 1 | 19 | RI = 3: PMI = 1 |
| . | . | . | . |
| . | . | . | . |
| . | . | . | . |
| 33 | RI = 2: PMI = 15 | 32 | RI = 3: PMI = 15 |
| 34 | RI = 2: confirm the latest PMI reported via PUSCH | 33 | RI = 3: confirm the latest PMI reported via PUSCH |
| 35~63 | Reserved | 34 | R = 4: PMI = 0 |
| | | 35 | RI = 4: PMI = 1 |
| | | . | . |
| | | . | . |
| | | 49 | RI = 4: PMI = 15 |
| | | 50 | RI = 4: confirm the latest PMI reported via PUSCH |
| | | 51~63 | Reserved |

Table 2 shows the contents of the precoding information of the 2-antenna-port closed-loop spatial multiplexing transmission mode according to the present embodiment and Table 3 shows the contents of the precoding information of the 4-antenna-port closed-loop spatial multiplexing transmission mode according to the present embodiment. In Tables 2 and 3, the confirmation information is included in portions described by bold characters and the base station informs the UE that the PMI reported via the n-x$^{th}$ subframe and more preferably an n-4$^{th}$ subframe is used on the basis of the n$^{th}$ subframe.

Hereinafter, the above-described embodiment will be described in detail according to the modes for transmitting the feedback information by the UE.

The information which is fed back to the base station by the UE includes Channel Quality Indicator (CQI) and PMI. In the 3GPP LTE system, the UE may report the feedback information via a physical uplink shared channel (PUSCH) or a physical uplink control channel (PUCCH). Tables 4 and 5 show the report types of the CQI/PMI for the PUSCH report mode and the PUCCH report mode.

TABLE 4

| | | PMI Feedback Type | | |
|---|---|---|---|---|
| | | No PMI | Single PMI | Multiple PMI |
| PUSCH CQI Feedback Type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | |

TABLE 5

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

In the PUSCH report mode shown in Table 4, the CRC may be attached in order to ensure the reliable CQI/PMI report. Accordingly, as described above, in a downlink control channel, the confirmation information indicating that the base station uses the PMI which is recently received from the UE may be used.

In the PUCCH report mode shown in Table 5, the CRC is not attached. The base station cannot check whether the CQI/PMI reported via the PUCCH is reliable or erroneous. In this case, in order to prevent confusion about the PMI between the base station and the UE from occurring, explicit PMI indicating information is required in downlink.

Accordingly, the confirmation information suggested in the above-described embodiment of the present invention considers only the PMI received via the PUSCH from the UE and does not consider the PMI received via the PUCCH.

Meanwhile, if the PUSCH data transmission and the PUCCH CQI/PMI transmission are simultaneously requested, PUCCH report bits may be piggy-backed to the PUSCH transmission. A resource allocation relationship of the PUCCH CQI/PMI report piggy-backed to the PUSCH will now be described.

Figure 4:
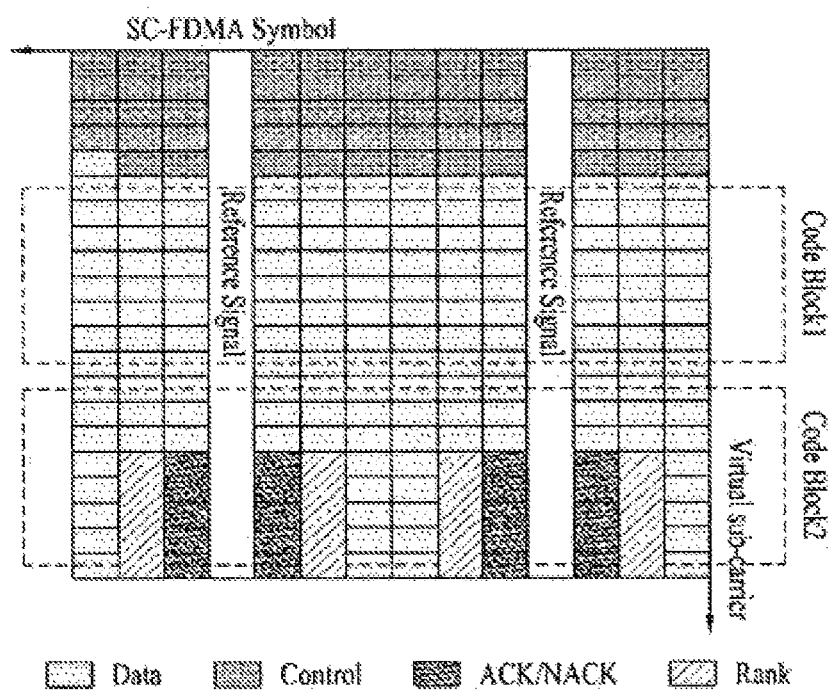
FIG. 4 is a view showing a resource allocation relationship in the case where a physical uplink shared channel (PUSCH) in which data, a control channel, ACK/NACK and rank information are multiplexed is transmitted.

FIG. 4 is a view showing a resource allocation relationship in the case where a PUSCH in which data, a control channel, ACK/NACK and rank information are multiplexed is transmitted.

First, the data and the control channel are multiplexed in series. In more detail, first, the control channel is multiplexed and then the data is continuously multiplexed. The multiplexed control channel and data is first mapped to one symbol region by increasing a virtual subcarrier index on a time axis and is then mapped to a next symbol region by the same method. Rank information is mapped to a symbol separated from a symbol for transmitting a reference signal by one symbol, and ACK/NACK information is mapped to symbols adjacent to the symbol for transmitting the reference signal from a symbol having a large virtual subcarrier index to a symbol having a small virtual subcarrier index. FIG. 4 shows the form in which the data, the control channel, the ACK/NACK and the rank information are multiplexed according to the above-described mapping order.

As shown in FIG. 4, if the PUSCH in which the data, the control channel, the ACK/NACK and the rank information are multiplexed is transmitted, the PUCCH CQI/PMI information piggy-backed to the PUSCH may be transmitted via a control channel region of FIG. 4.

If the PUSCH to which the PUCCH feedback information is piggy-backed is transmitted, the following matters are suggested in the present embodiment.

First, in the present embodiment, the PUCCH feedback information piggy-backed to the PUSCH does not include the CRC. Since the explicit PMI indicating information transmission is included in the downlink control signaling, the PUCCH feedback information does not include the CRC. Since the PUCCH feedback information has as a small size of 10 to 12 bits as a maximum, the attachment of the CRC having a size of 8 bits may excessively increase the overhead in order to search for an error.

Second, in the present embodiment, the PUCCH feedback information piggy-backed to the PUSCH is not considered as the PMI indicated by the confirmation information. If the confirmation information is set in the downlink control signaling of the $n^{th}$ subframe, the UE assumes that the latest PMI reported by the UE is used by the base station before the $n-x^{th}$ subframe as described above. Accordingly, if the PUCCH feedback information piggy-backed to the PUSCH is considered as the latest PMI as described above, the PUSCH report mode has information having a larger size with respect to a channel status, system performance may seriously deteriorate.

Accordingly, in a preferred embodiment of the present invention, if the confirmation information set in the precoding information of the closed-loop spatial multiplexing transmission mode is transmitted via a specific resource block (RB) of the $n^{th}$ subframe, the confirmation information indicates that the PMI transmitted via the PUSCH of the $n-4^{th}$ subframe or a subframe prior thereto, that is, the PMI except for the PMI transmitted via the PUCCH, is used by the base station.

Meanwhile, among the transmission modes of Table 4, Mode 1-2, Mode 2-2 and Mode 3-1 corresponding to a single PMI transmission mode and a multi PMI transmission mode will be described in detail as follows.

First, Mode 1-2 corresponding to the wideband feedback will be described. In Mode 1-2, preferred precoding matrixes are selected from the codebook on the assumption that transmission is made by only corresponding subbands. The UE reports one wideband CQI value per codeword, which is calculated when it is assumed that a selected precoding matrix is used in each subband and is transmitted by S subbands. The UE reports the selected PMI to each of the S subbands.

In addition, Mode 3-1 corresponding to the subband feedback configured by an upper layer will be described. In Mode 3-1, one precoding matrix is selected from the codebook on the assumption that transmission is made by S subbands. The UE reports one wideband CQI value per codeword for the S subbands, which is calculated when it is assumed that the transmission is made by the S subbands and one precoding matrix is used in all the subbands. The UE reports the selected PMI to each of the S subbands. The UE transmits one PMI.

Finally, Mode 2-2 corresponding to the subband feedback selected by the UE will be described. In Mode 2-2, the UE selects M preferred subbands having a size k in a set of S subbands and selects a preferred precoding matrix, which will be used for the transmission via the selected M subbands, from the codebook. Thereafter, the UE may report one CQI per codeword in consideration of the case where transmission is made using a selected precoding matrix via the preferred M subbands as described above. The UE may report a preferred precoding matrix with respect to the selected M subbands. On the assumption that the transmission is made via the S subbands, one precoding matrix is selected from the codebook. The UE may report the wideband CQI per codeword on the assumption that the transmission is made by the S subbands and one precoding matrix is used in all the subbands. The UE may report a selected PMI with respect to all the S subbands.

The whole overhead when the transmission modes 1-2, 2-2 and 3-1 are implemented by different system configurations is as follows.

TABLE 6

| Mode | No. CW | 5 MHz (25 RBs) | | 10 MHz (50 RBs) | | 20 MHz (100 RBS) | |
|------|--------|------|------|------|------|------|------|
|      |        | 2-TX | 4-TX | 2-TX | 4-TX | 2-TX | 4-TX |
| 1-2  | 1      | 25   | 32   | 31   | 40   | 43   | 56   |
|      | 2      | 21   | 35   | 25   | 43   | 33   | 59   |
| 2-2  | 1      | 21   | 23   | 25   | 27   | 30   | 32   |
|      | 2      | 24   | 28   | 28   | 32   | 33   | 37   |
| 3-1  | 1      | 21   | 22   | 25   | 26   | 33   | 34   |
|      | 2      | 37   | 39   | 45   | 47   | 61   | 63   |

In Table 6, the system band includes 5 MHz (25 RB), 10 MHz (50 RB) 20 MHz (100 RB) and the overhead according to each transmission mode is represented by the bit number in 2-transmission-antenna (2 Tx) and 4-transmission-antenna (4 Tx).

In Table 6, only the information bit is considered in each transmission mode. Accordingly, if an additional redundant bit for checking an error, such as the CRC, is included, the information bit needs to be considered.

Generally, in downlink, the base station represents only the confirmation information of one PMI via the confirmation field. In this case, in Mode 3-1 corresponding to the single PMI transmission mode, since the base station can use one PMI fed back from the UE regardless of whether or not the error exists, the advantage due to the use of the confirmation information is reduced in order to reduce the overhead. In contrast, in Modes 1-2 and 2-2 corresponding to the multi PMI transmission mode, the advantage due to the transmission of the confirmation information indicating that the PMIs transmitted from the UE are used by the base station can be obtained. Information indicating which of the PMIs is used can be obtained by clarifying the temporal relationship between the feedback of the PMI and the transmission of the confirmation information as described with reference to FIG. 3. Thus, it is possible to prevent confusion between the base station and the UE from occurring.

According to the embodiment, if the CRC is used only in Modes 1-2 and 2-2 corresponding to the multi PMI transmission mode, the whole overhead is as follows.

TABLE 7

| Mode | No. CW | 5 MHz (25 RBs) | | 10 MHz (50 RBs) | | 20 MHz (100 RBS) | |
|------|--------|--------|--------|--------|--------|--------|--------|
|      |        | 2-TX   | 4-TX   | 2-TX   | 4-TX   | 2-TX   | 4-TX   |
| 1-2  | 1      | 25 + L | 32 + L | 31 + L | 40 + L | 43 + L | 56 + L |
|      | 2      | 21 + L | 35 + L | 25 + L | 43 + L | 33 + L | 59 + L |
| 2-2  | 1      | 21 + L | 23 + L | 25 + L | 27 + L | 30 + L | 32 + L |
|      | 2      | 24 + L | 28 + L | 28 + L | 32 + L | 33 + L | 37 + L |
| 3-1  | 1      | 21     | 22     | 25     | 26     | 33     | 34     |
|      | 2      | 37     | 39     | 45     | 47     | 61     | 63     |

In Table 7, "L" denotes the bit number of the CRC, which may be changed according to the bandwidth and/or the size of the information bits. For example, as the CRC attached to the modes 1-2 and 2-2, a CRC having a length of 16 bits may be used. A polynomial of generating such a CRC may be expressed as follows.

$$g_{CRC16}(D)=[D^{16}+D^{12}+D^{5}+1] \text{ for a CRC length } L=16 \quad \text{Equation 1}$$

Figure 5:
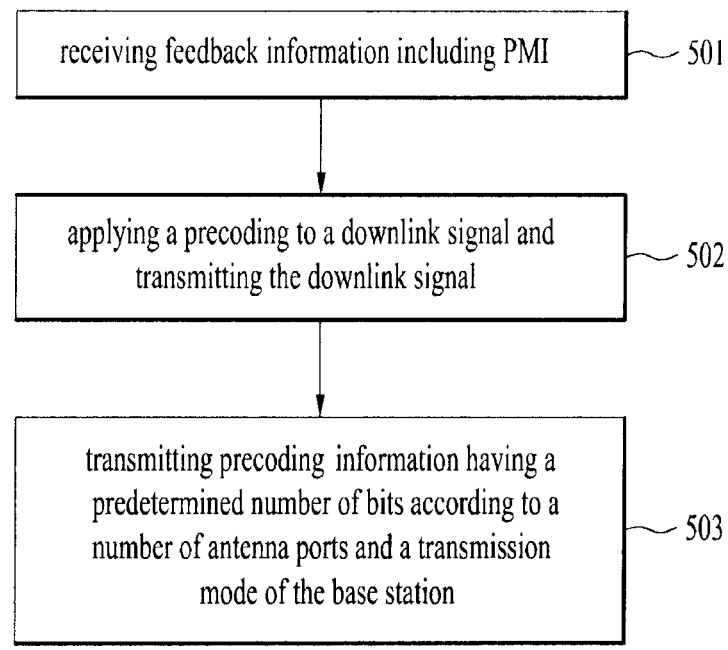
FIG. 5 is a diagram explaining an example of a method of transmitting downlink control information by the base station in accordance with one embodiment of the present invention.

FIG. 5 is a diagram explaining an example of a method of transmitting downlink control information by the base station in accordance with one embodiment of the present invention. Referring to FIG. 5, the base station receives feedback information including a PMI from the UE. (S501) The base station applies a precoding to a downlink signal and transmits the downlink signal to the UE. (S502) And then, the base station transmits precoding information having a predetermined number of bits according to a number of antenna ports and a transmission mode of the base station to the UE. (S503)

Here, the precoding to the downlink signal for a specific resource block (RB) in $n^{th}$ subframe is according to a latest PMI received from the UE on or before n-$x^{th}$ subframe. "x" is a predetermined integer or an integer determined by upper layer signaling higher than a physical layer.

A CRC having a length of 8, that is, L=8, may be attached to the modes 1-2 and 2-2.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

As described above, according to a method for transmitting and receiving downlink control information of the embodiments of the present invention, it is possible to efficiently inform a user equipment of information about PMI used by an base station using a small amount of precoding information and minimize the overhead while maintaining system performance by efficiently setting the CRC attachment.

Such a method is applicable to various systems such as a 3GPP LTE-A system and an IEEE 802.16 series system as well as the 3GPP LTE system by the same principle.

The invention claimed is:

1. A method for transmitting downlink signals to an user equipment (UE) by a base station, the method comprising:
   receiving at least one precoding matrix index (PMI) from the UE; and
   transmitting a downlink control signal and a downlink data signal applied a precoding,
   wherein, if the at least one PMI is received via a physical uplink shared channel (PUSCH) not coming from a physical uplink control channel (PUCCH), the downlink control signal includes a first message indicating that the base station has applied the precoding using the at least one PMI received from the UE.

2. The method according to claim 1, wherein, if the at least one PMI is received via the PUCCH or the PUSCH coming from the PUCCH, the downlink control signal includes a second message indicating which PMI is used for the precoding by the base station.

3. The method according to claim 2, wherein a cyclic redundancy check (CRC) is attached to the at least one PMI received via the PUSCH not coming from the PUCCH, and the CRC is not attached to the at least one PMI received via the PUCCH.

4. The method according to claim 3, wherein the CRC is not attached to the at least one PMI which is received via the PUSCH coming from the PUCCH.

5. The method according to claim 1, wherein the downlink data signal is transmitted using a closed-loop spatial multiplexing transmission mode.

6. The method according to claim 1, wherein the downlink control signal and the downlink data signal are transmitted in $n^{th}$ subframe, and the at least one PMI is received on or before n-$4^{th}$ subframe.

7. A method for receiving downlink signals from a base station by a user equipment (UE), the method comprising:
   transmitting at least one precoding matrix index (PMI) to the base station; and
   receiving a downlink control signal and a downlink data signal from the base station, wherein the base station has applied a precoding to the downlink data signal,
   wherein, if the at least one PMI is transmitted via a physical uplink shared channel (PUSCH) not coming from a physical uplink control channel (PUCCH), the downlink control signal includes a first message indicating that the base station has applied the precoding using the at least one PMI.

8. The method according to claim 7, wherein, if the at least one PMI is transmitted via the PUCCH or the PUSCH coming from the PUCCH, the downlink control signal includes a second message indicating which PMI is used for the precoding by the base station.

9. The method according to claim 7, wherein transmitting the at least one PMI comprises attaching a cyclic redundancy check (CRC) to the at least one PMI transmitted via the PUSCH not coming from the PUCCH, and
   wherein the CRC is not attached to the at least one PMI transmitted via the PUCCH.

10. The method according to claim 9, wherein the CRC is not attached to the at least one PMI in the PUCCH which is received via the PUSCH coming from the PUCCH.

11. The method according to claim 7, wherein the downlink data signal is transmitted using a closed-loop spatial multiplexing transmission mode by the base station.

12. The method according to claim 7, wherein the downlink control signal and the downlink data signal are received in $n^{th}$ subframe, and the at least one PMI is transmitted on or before n-$4^{th}$ subframe.

* * * * *